US 6,523,674 B1

(12) United States Patent
Ouellette

(10) Patent No.: US 6,523,674 B1
(45) Date of Patent: Feb. 25, 2003

(54) BELT CONVEYOR TRANSITION WITH VACUUM STABILIZATION

(75) Inventor: Joseph F. Ouellette, St. Louis, MO (US)

(73) Assignee: Ouellette Machinery Systems, Inc, Fenton, MO (US)

( * ) Notice: Subject to any disclaimer, the term of this patent is extended or adjusted under 35 U.S.C. 154(b) by 0 days.

(21) Appl. No.: 10/071,939

(22) Filed: Feb. 6, 2002

(51) Int. Cl.⁷ ............................................... B65G 13/02
(52) U.S. Cl. ............................. 198/689.1; 198/457.05; 198/452
(58) Field of Search ................................ 198/453, 452, 198/457.05, 689.1, 456

(56) References Cited

U.S. PATENT DOCUMENTS 4,768,643 A * 9/1988 Lenhart ............... 198/689.1 X
5,605,217 A * 2/1997 Risley et al. ......... 198/689.1 X
5,664,662 A * 9/1997 Wilson et al. ............... 198/453
6,241,074 B1 * 6/2001 Steeber .............. 198/457.05 X

* cited by examiner

Primary Examiner—James R. Bidwell
(74) Attorney, Agent, or Firm—Thompson Coburn LLP

(57) ABSTRACT

A transition between two sections of belt conveyors transfers a series of objects conveyed on the ending section of one conveyor through a pair of guide rails laterally over to a beginning section of the second conveyor. A source of vacuum is positioned between the ending section of the one conveyor and the beginning section of the second conveyor and holds the conveyed objects to the two conveyor surfaces as the objects are transferred between the two surfaces and thereby eliminates the problem of one or more conveyed objects falling over as they are transferred from the one conveyor surface to the second conveyor surface.

22 Claims, 3 Drawing Sheets

BELT CONVEYOR TRANSITION WITH VACUUM STABILIZATION

BACKGROUND OF THE INVENTION

1. Field of the Invention

The present invention pertains to a transition between two longitudinal sections of belt conveyors where a series of objects conveyed on the ending section of one conveyor are transferred by a pair of guide rails laterally over to a beginning section of the second conveyor. In particular, the present invention pertains to a source of vacuum positioned between the ending section of the one conveyor and the beginning section of the second conveyor where the source of vacuum holds the conveyed objects to the two conveyor surfaces as the objects are transferred between the two surfaces and thereby eliminates the problem of one or more conveyed objects falling over as they are transferred from the one conveyor surface to the second conveyor surface.

2. Description of the Related Art

Belt conveyors are often used in manufacturing and packaging facilities to quickly transfer a series of objects being manufactured and/or packaged from one area of the facility to another. A typical type of belt conveyor is a table top, chain conveyor that is comprised of a plurality of panels that are connected together, end to end, in a chain linked manner forming a continuous loop or belt from the plurality of panels. The belt of panels is supported and driven by a drive sprocket/pulley at one end and an idler or driven sprocket/pulley at its opposite end. The upper plurality of panels extending between the two pulleys defines a support surface of the conveyor that functions as a conveying surface that conveys objects supported on the conveying surface from one end of the conveyor to the opposite end. The intermediate portion of the belt between the two pulleys is typically supported by laterally spaced sliding surfaces positioned beneath the portion of the belt. The belt rests on the sliding surfaces and slides across the surfaces between the pulleys at the opposite ends of the belts.

By supporting the length of the conveyor belt between the drive and driven pulleys with the sliding surface positioned beneath the upper section of the belt, the conveyor belt can extend for a considerable length between the drive and driven pulleys. However, the longer the conveyor belt, the more power is required of the motor driving the conveyor belt drive pulley. Therefore, it is often necessary to employ two or more conveyor belt assemblies to convey objects for longer distances.

To provide a continuous conveyor path between two or more belt conveyors, a beginning section of a second or downstream conveyor belt assembly is positioned adjacent and to one side of an ending section of a first or upstream conveyor belt assembly. With the beginning portion of the downstream belt assembly positioned adjacent the ending portion of the upstream belt assembly, the two conveyor belt assemblies provide a continuous conveyor path for objects conveyed on the supporting surfaces of the two belt assemblies. Pairs of guide rails are positioned over the conveying surfaces of the two belt assemblies and are connected by pairs of curved or S-shaped guide rails. The S-shaped guide rails connect the pair of parallel guide rails that extend over the length of the upstream conveyor belt with the pair of parallel guide rails that extend over the length of the downstream conveyor belt. The pair of S-shaped guide rails gradually curve from positions over the upstream conveyor support surface, across the transition area between the two overlapping sections of the conveyors, to positions over the downstream conveyor support surface. The S-shaped guide rails gradually channel the stream of objects conveyed by the upstream conveyor support surface over the transition area between the two conveyors to the downstream conveyor support surface.

To convey a stream of lightweight objects, for example empty, plastic blow molded bottles, vacuum pressure is often used to hold the lightweight objects down on the conveying surface of a conveyor. Holes are provided through the plates of the conveyor to communicate a source of vacuum pressure beneath the conveyor with the conveying surface of the conveyor and to hold lightweight objects down on the conveying surface as they are conveyed along the length of the conveyor. However, due to the constructions of the belt conveyors and the manner in which the interlinked belt plates are supported from their undersides along the laterally opposite edges of the plates, the holes in the plates of the belt could only be positioned along the centers of the lengths of the conveyors. This proved to be a problem when a stream of objects is transitioned from the ending portion of one conveyor to the beginning portion of an adjacent conveyor. As the S-shaped transition guide rails would push the stream of objects from the ending portion of one conveyor across the conveyor transition area to the beginning portion of the second conveyor, the guide rails would push the stream of objects away from the source of vacuum pressure of the one conveyor, across the transition, toward the source of vacuum pressure of the second conveyor. Thus, as the bottles would be transitioned from the ending portion of one conveyor to the beginning portion of the second conveyor, there would be no vacuum pressure available to hold the stream of objects down on the two conveying surfaces. Furthermore, as the stream of objects is channeled through the S-shaped transition, the engagement of the lightweight objects with the S-shaped guide rails that push the objects laterally across from one conveyor to the other conveyor would often impart a spin to the bottles. The spin produced by the conveyor guide rails and the absence of vacuum pressure holding the lightweight objects on the conveying surfaces would often result in one or more of the lightweight objects being toppled over on the conveying surfaces disrupting the continuous stream of upright conveyed objects.

To address this problem, a plurality of holes of the same size and shape were provided in the gap between the ending portion of the one conveyor and the beginning portion of the other conveyor. These holes communicated with the vacuum source and provided vacuum pressure in the gap between the ending portion of the one conveyor and the beginning portion of the other conveyor and were effective in holding the lightweight conveyed objects to the conveying surfaces of the two conveyor portions. However, this remedy was found to be insufficient to eliminate the problem of the guide rails S-shaped transition portions imparting a spin to the lightweight conveyed objects that would cause the objects to topple over as they are conveyed through the transition.

What is needed is a means of eliminating the problem of lightweight objects conveyed through the S-shaped guide rail transition between the ending portion of one conveyor and the beginning portion of another conveyor from toppling over in the transition section.

SUMMARY OF THE INVENTION

The present invention addresses the problem of lightweight conveyed objects, for example empty plastic blow molded bottles, toppling over in the S-shaped guide rails transition between the ending portion of an upstream conveyor and the beginning portion of a downstream conveyor by providing an improved distribution of vacuum pressure in the gap between the two conveyor portions.

The belt conveyor transition of the present invention is constructed along a typical transition between an ending portion of an upstream belt conveyor and a beginning portion of a downstream belt conveyor. The ending portion of the upstream conveyor and the beginning portion of the downstream conveyor overlap in a side-by-side relationship. The conveying surface of the ending portion of the upstream conveyor is positioned in the same plane and adjacent the conveying surface of the beginning portion of the downstream belt conveyor. There is a small lateral gap between the ending portion and the beginning portion of the two conveyors.

A source of vacuum pressure is provided in the gap between the two conveyor portions. However, unlike the prior art source of vacuum pressure provided by a plurality of identical holes communicating with the vacuum sources, the vacuum stabilization of the present invention is provided by a varying degree of vacuum pressure in the lateral gap between the two conveyor portions. As the S-shaped conveyor guide rails extend across the transition area from the ending portion of the upstream conveyor to the beginning portion of the downstream conveyor, the source of vacuum pressure provided by the vacuum stabilization system of the invention is at its greatest as the transition across the conveyor portions begins and then gradually decreases in the downstream direction. In this manner) the strongest vacuum pressure that holds the stream of objects conveyed from the conveying surface of one conveyor to the other is provided at the beginning of the transition period and then gradually decreases as the stream of objects is conveyed from the upstream conveyor to the downstream conveyor.

The variable source of vacuum pressure of the vacuum stabilization system of the invention is provided by a plurality of apertures arranged in the gap between the two conveyor portions where the apertures are of different sizes and/or shapes. The apertures communicate with a vacuum source provided through a plenum positioned below the two conveying surfaces. In the preferred embodiment of the invention, the apertures are provided in a single line that extends in the downstream direction between the two conveying surfaces. In addition, several of the apertures at the beginning of the line of apertures have larger areas than several of the apertures at the end or downstream end of the line of apertures. Still further, several of the apertures at the beginning of the line are given oblong configurations with their major axes being larger than their minor axes and with their major axes extending in the downstream direction. These oblong apertures are arranged end to end along the line of apertures. However, the oblong apertures are only positioned at the beginning of the transition section and several circular apertures are arranged at the end of the transition section. Together, the several oblong apertures and circular apertures make up the plurality of apertures of the vacuum stabilization system. By providing larger, oblong-shaped apertures at the beginning of the transition section and smaller, circular apertures at the end of the transition section, the vacuum stabilization system of the invention provides a stronger vacuum source at the beginning of the transition of the conveyed objects from the upstream conveyor section to the downstream conveyor section. When the transition of the conveyor objects from the upstream section to the downstream section is substantially completed, the plurality of apertures change over to the smaller, circular apertures where a greater vacuum force is not needed to stabilize the lightweight objects as they are conveyed through the transition section.

By providing the plurality of apertures in a single line through the gap between the two conveyor surfaces and providing the apertures with larger shaped and sized apertures at the beginning or upstream end of the line than the apertures at the end or downstream end of the line, the vacuum stabilization system of the invention provides a greater source of vacuum pressure at the beginning of the conveyor transition where the stream of conveyed objects are first pushed away from the vacuum source of the upstream conveyor belt. The vacuum stabilization system also provides a gradually decreasing source of vacuum pressure in the gap between the two belt sections as the stream of objects are pushed by the S-shaped guide rails across the gap and onto the source of vacuum pressure of the downstream conveyor section.

BRIEF DESCRIPTION OF THE DRAWINGS

Further features of the invention are revealed in the following detailed description of the preferred embodiment of the invention and in the drawing figures wherein.

DETAILED DESCRIPTION OF THE PREFERRED EMBODIMENTS

Figure 1:
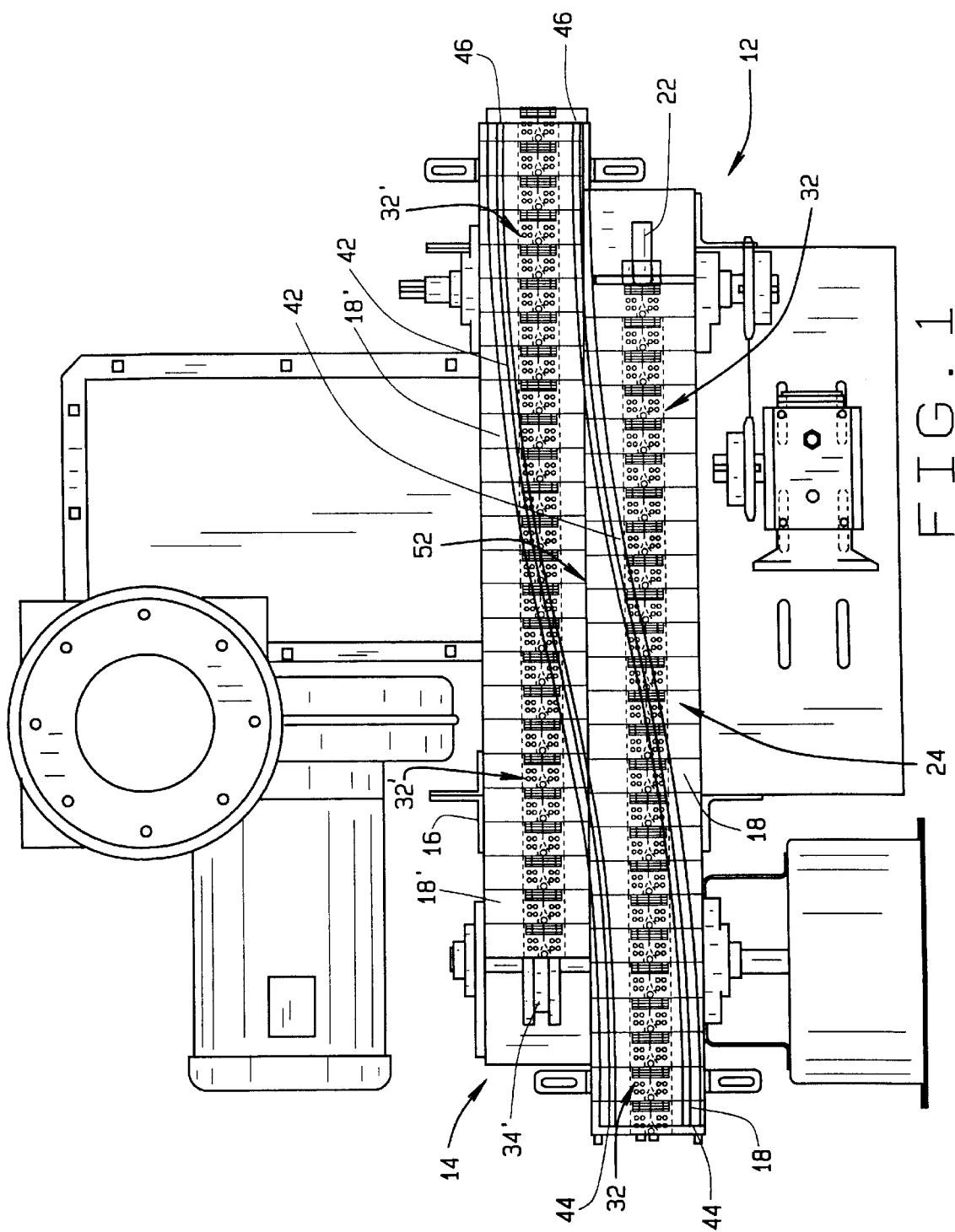
FIG. 1 is a plan view of a belt conveyor transition employing the vacuum stabilization system of the present invention.
Figure 2:
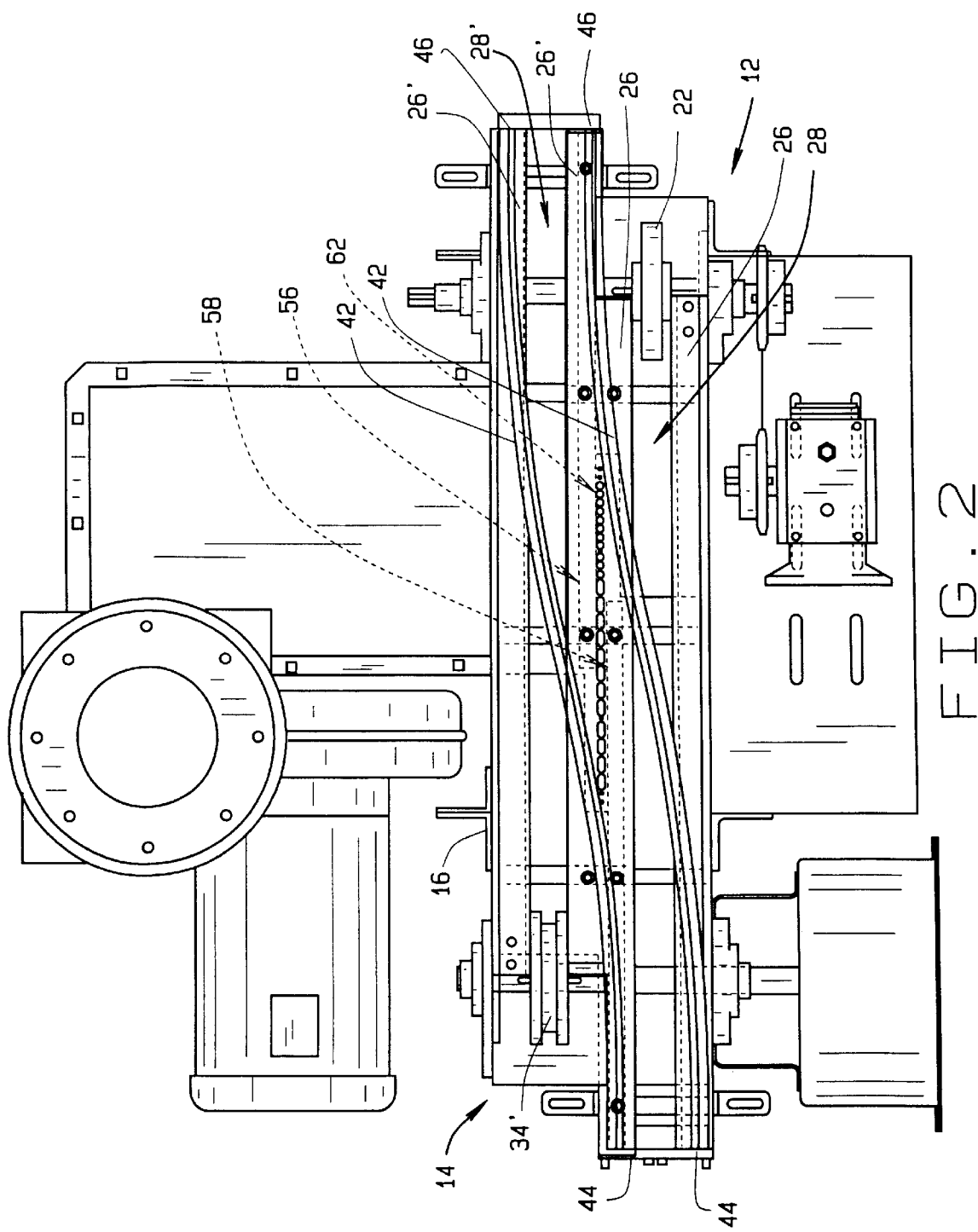
FIG. 2 is a plan view similar to that of FIG. 1 but with portions of the upstream and downstream conveyors shown in FIG. 1 removed to show more detail of the vacuum stabilization system of the invention.
Figure 3:
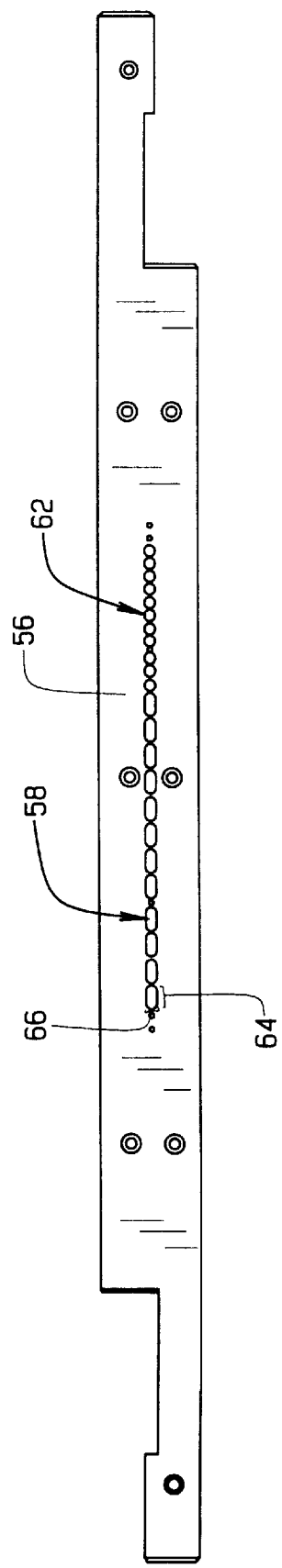
FIG. 3 is a plan view of the plate of the vacuum stabilization system of the invention employing the plurality of different sized and shaped apertures that communicate with the vacuum source.

FIG. 1 shows a transition along a longitudinal conveyor path from an ending portion 12 of an upstream belt conveyor to a beginning portion 14 of a downstream belt conveyor where the stream of objects (not shown) conveyed by the upstream conveyor is transitioned laterally over to the downstream conveyor. Many the component parts of the transition shown in FIGS. 1 and 2 are known in the prior art and therefore will only be described generally.

Both the ending portion of the upstream conveyor 12 and the beginning portion of the downstream conveyor 14 are supported on a support structure 16 of the conveyor system that positions conveying surfaces of the two conveyors horizontally adjacent each other. The upstream conveyor, the ending portion 12 of which is only shown in FIG. 1, is a belt-type conveyor and preferably what is known as a table top chain conveyor. The conveyor is constructed of a plurality of panels 18 that are interconnected by hinges forming the chain of the belt conveyor. The belt formed of the panels 18 is looped over a drive sprocket or pulley 22 at one end and an idler sprocket or pulley (not shown) at the opposite end of the conveyor. As shown in FIG. 1, the upstream conveyor conveys a series of objects supported on the conveyor from left to right. It can be seen that the plurality of chain panels 18 that form the belt of the conveyor also form a horizontally oriented supporting and conveying surface 24 that conveys a stream of objects supported on the conveying surface from the beginning of the upstream conveyor (not shown) to the left in FIG. 1 to the ending portion 12 of the upstream conveyor. To ensure that the conveying surface remains in its horizontal orientation as it conveys objects from left to right as shown in FIG. 1, the plurality of chain panels 18 that make up the conveyor belt are supported on a pair of elongated sliding surfaces 26 positioned beneath the conveyor panels. The sliding surfaces 26 are spaced laterally from each other to accommodate the driving connection between the panels 18 of the conveyor belt and the drive sprocket 22.

The lateral spacing of the sliding surfaces 26 also provides a space 28 between the surfaces for accommodation of an air plenum (not shown) that communicates with a vacuum source (not shown). To communicate the vacuum pressure of the vacuum source to the conveying surface 24 of the conveyor, the panels 18 of the upstream belt conveyor chain are provided with pluralities of vacuum holes 32 as seen in FIG. 1. The vacuum holes 32 are provided in the center areas of each of the conveyor belt panels 18 where they communicate with the vacuum plenum positioned in the lateral spacing 28 beneath the belt conveyor supporting surface. The vacuum pressure communicated through the holes 32 to the conveyor supporting surface assists in holding conveyed objects securely to the conveying surface.

The construction of the downstream conveyor is basically the same as that as the upstream conveyor and therefore the same reference numbers are used to identify corresponding component parts of the downstream conveyor as were used for the upstream conveyor, except that the reference numbers identifying component parts of the downstream conveyor are followed by a prime ('). The downstream conveyor is also constructed of a plurality of interconnected panels 18' that are connected by hinges forming the chain of the belt conveyor. As viewed in FIGS. 1 and 2, the downstream conveyor extends from an idler sprocket or pulley 34 at its left hand end to a drive sprocket or pulley (not shown) at its right hand end. The panels 18' of the downstream conveyor are also supported on a pair of laterally spaced sliding surfaces 26'. The lateral spacing 28' between the sliding surfaces of the downstream conveyor also accommodates a vacuum source plenum (not shown) that communicates vacuum pressure to the underside of the conveyor panels. Each of the conveyor panels 18' is provided with a plurality of vacuum holes 32' at a central area of the panel that communicates the vacuum pressure in the vacuum plenum to the conveying surface of the downstream conveyor.

A pair of S-shaped guide rails 42 affect the transition of the stream of objects conveyed by the ending portion of the upstream conveyor 12 to the beginning portion of the downstream conveyor 14. The left hand ends 44 of the S-shaped guide rails shown in FIGS. 1 and 2 communicate with the pair of parallel guide rails (not shown) that extend over the majority of the length of the upstream conveyor and direct objects conveyed on the conveying surface of the conveyor in a straight line toward the transition. The right hand ends 46 of the S-shaped guide rails shown in FIGS. 1 and 2 communicate with the pair of parallel guide rails (not shown) positioned over the majority of the length of the downstream conveyor and direct the stream of conveyed objects in a straight line along the conveying surface of the downstream conveyor. The pair of S-shaped guide rails 42 provide a smooth transition of the series of objects conveyed by the upstream conveyor from the ending portion 12 of the upstream conveyor to the beginning portion 14 of the downstream conveyor.

The construction of the conveyor transition shown in FIGS. 1 and 2 described to this point is conventional. In operation, the upstream conveyor conveys a stream of objects supported on the conveying surface of the conveyor in a longitudinal direction from left to right as viewed in FIGS. 1 and 2 toward the S-shaped guide rails 42 of the transition. The stream of objects are directed through the S-shaped guide rails 42 across a lateral gap 52 between the conveyors from the supporting surface of the upstream conveyor ending portion 12 to the support surface of the downstream conveyor beginning portion 14. Once transferred to the supporting surface of the downstream conveying beginning portion 14, the S-shaped guide rails 42 direct the stream of conveyed objects in the longitudinally direction from left to right as viewed in FIGS. 1 and 2.

It can be seen that as the pair of S-shaped guide rails 42 transfer the stream of objects laterally from the ending portion of the upstream conveyor 12 to the beginning portion of the downstream conveyor 14, as the objects pass over the lateral gap 52 between the two conveyor portions they are pushed by the guide rails away from their positions above the vacuum holes 32 of the upstream conveyor 12 toward the vacuum holes 32' of the downstream conveyor 14. Between the vacuum holes of the two conveyor portions when the stream of objects are pushed across the lateral gap 52 between the conveyor portions, they are exposed to the least amount of vacuum pressure holding the objects to the conveying surfaces. As explained earlier, this condition led to the problem of one or more objects beginning to spin as they are pushed across the bottom most of the pair of S-shaped guide rails 42 as viewed in FIGS. 1 and 2. The spinning of the objects often would lead to the objects falling over on the conveying surfaces. To overcome this problem, a series of holes were provided in the lateral gap 52 that communicated with the vacuum sources beneath the conveying surfaces. However, it was found that this remedy was inadequate for overcoming the problem of bottles spinning as they pass through the transition section and falling over on the conveying surfaces.

The transition section of the present invention provides a plate 56 that is mounted on the conveyor support structure over the vacuum source (not shown) beneath the conveying surfaces of the upstream conveyor ending portion 12 and the downstream conveyor beginning portion 14. The plate 56 also has a plurality of apertures formed in the plate, however the apertures are arranged in a first group of apertures 58 and a second group of apertures 62. In the preferred embodiment, the apertures are arranging in a single longitudinal line between the conveying surfaces of the upstream conveyor ending portion and the downstream conveyor beginning portion 14. The first group of apertures 58 are given larger opening areas than the 14) second group of apertures 62 to provide a greater vacuum source at the beginning of the transition between the two conveyor portions. As the series of apertures extends longitudinally in the downstream direction, the source of vacuum pressure decreases due to the decrease in the area of the second group of apertures 62 from the first group of apertures 58. In order to increase the area of the first group of apertures 58 exposed through the gap 52 between the two conveyor portions 12,14, the first group of apertures are given an oblong configuration with mutually perpendicular major 64 and minor 66 axes. The major axes 64 are larger than the minor axes 66 and extend in the downstream direction. Thus, the first group of apertures 58 supply an increased vacuum pressure to the undersides of the objects conveyed by the upstream conveyor ending portion 12 just as the pair of S-shaped guide rails 42 begin to push the stream of objects laterally and just as the tendency of the objects to spin is greatest. In this manner, the first group of apertures 58 resists the spinning of the objects as the pair of guide rails 42 transition or push the stream of objects laterally from the upstream conveyor ending portion 12 to the downstream conveyor beginning portion 14. As the tendency of the stream of objects to spin decreases as the objects move in the downstream direction, the size of the apertures changes from the first group of apertures 58 to the second group of apertures 62 having the smaller areas. As the stream of objects pass over the second group of apertures 62, their tendency to spin is not as great as the S-shaped guide rails 42 complete the positioning of the stream of objects over the vacuum holes 32' of the downstream conveyor beginning portion 14.

Thus, by providing at least two groups of apertures communicating with a vacuum source where each group has different shapes and different areas, the problem of spinning of conveyed objects moved through a transition area from one conveyor to another conveyor is overcome. Although the preferred embodiment of the invention describes the vacuum apertures as being divided into two groups having different areas and different shapes, depending on the vacuum pressure and the particular application, the shapes of apertures could be provided in more than two groups of shapes and the areas of the apertures could be provided in more than two groups of areas.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A conveyor transition comprising:
   a first conveyor section having a first conveying surface that conveys objects supported on the first conveying surface in a downstream direction;
   a second conveyor section having a second conveying surface that conveys objects supported on the second conveying surface in the downstream direction, the second conveying surface being positioned adjacent the first conveying surface with there being a gap between the first and second conveying surfaces; and
   a source of vacuum pressure in the gap with a vacuum pressure that decreases in the downstream direction.

2. The conveyor transition of claim 1, further comprising:
   a plurality of apertures in the gap and the vacuum pressure being communicated through the plurality of apertures.

3. The conveyor transition of claim 2, further comprising:
   the plurality of apertures being arranged in a single line in the downstream direction.

4. The conveyor transition of claim 2, further comprising:
   the plurality of apertures having different sizes.

5. The conveyor transition of claim 2, further comprising:
   the plurality of apertures having different shapes.

6. The conveyor transition of claim 1, further comprising:
   at least one aperture in the gap that defines an area of access to the vacuum pressure, the area of access decreasing in the downstream direction.

7. The conveyor transition of claim 6, further comprising:
   the one aperture being one of a plurality of apertures that together define the area of access to the vacuum pressure.

8. The conveyor transition of claim 1, further comprising:
   the first conveyor section is a section of a first belt conveyor and the second conveyor section in a section of a second belt conveyor and the first and second belt conveyors have longitudinal lengths with adjacent longitudinal edges and the source of vacuum pressure is positioned between the adjacent longitudinal edges.

9. A conveyor transition comprising:
   a first conveyor section having a first conveying surface that conveys objects supported on the first conveying surface in a downstream direction;
   a second conveyor section having a second conveying surface that conveys objects supported on the second conve surface in the downstream directions; the second conveying surface being positioned adjacent the first conveying surface with there being a gap between the first and second conveying surfaces;
   a plurality of apertures in the gap, the apertures being of different sizes; and
   a source of vacuum pressure communicating with the gap through the plurality of apertures.

10. The conveyor transition of claim 9, further comprising;
    the plurality of apertures being arranged in a single line in the downstream direction.

11. The conveyor transition of claim 9, further comprising:
    the plurality of apertures being arranged in a decreasing size arrangement in the downstream direction.

12. The conveyor transition of claim 9, further comprising:
    the plurality of apertures having different shapes.

13. The conveyor transition of claim 9, further comprising:
    at least one of the plurality of apertures being oblong with mutually perpendicular minor and major axes, the major axis being larger than the minor axis.

14. The conveyor transition of claim 13, further comprising:
    the major axis extending in the downstream direction.

15. The conveyor transition of claim 13, further comprising:
    at least one of the plurality of apertures being circular.

16. The conveyor transition of claim 9, further comprising:
    several of the plurality of apertures being oblong with mutually perpendicular minor and major axes, the major axes being larger than the minor axes and the major axes extending in the downstream direction.

17. The conveyor transition of claim 9, further comprising:
    the first conveyor section being a section of a first belt conveyor and the second conveyor section being a section of a second belt conveyor and the first and second belt conveyors having longitudinal lengths with longitudinal edges, an edge of the first belt conveyor being positioned adjacent an edge of the second belt conveyor and defining the gap between the adjacent edges.

18. A conveyor transition comprising:

a first conveyor section having a first conveying surface that conveys objects supported on the first conveying surface in a downstream direction;

a second conveyor section having a second conveying surface that conveys objects supported on the second conveying surface in a downstream direction, the second conveying surface being positioned adjacent the first conveying surface with there being a gap between the first and second conveying surfaces;

a plurality of apertures in the gap, the plurality of apertures being of different shapes; and a source of vacuum pressure communicating with the gap through the plurality of apertures.

19. The conveyor transition of claim 18, further comprising:

the plurality of apertures being arranged in a single line in the downstream direction.

20. The conveyor transition of claim 18, further comprising:

the plurality of apertures being arranged in a decreasing size arrangement in the downstrearn direction.

21. The conveyor transition of claim 18, further comprising:

several of the plurality of apertures being oblong with mutually perpendicular minor and major axes, the major axis being larger than the minor axis and the major axis extending in the downstreamn direction.

22. The conveyor transition of claim 18, further comprising:

the first conveyor section being a section of a first belt conveyor and the second conveyor section being a section of a second belt conveyor and the first and second belt conveyors having longitudinal lengths with longitudinal edges, an edge of the first belt conveyor being positioned adjacent an edge of the second belt conveyor and defining the gap between the adjacent edges.

* * * * *